United States Patent [19]

Inoue

[11] 4,295,726

[45] Oct. 20, 1981

[54] BLADE TYPE FOCAL PLANE SHUTTER

[75] Inventor: Nobuyoshi Inoue, Kawagoe, Japan

[73] Assignee: Copal Company Limited, Tokyo, Japan

[21] Appl. No.: 188,286

[22] Filed: Sep. 18, 1980

[30] Foreign Application Priority Data

Sep. 20, 1979 [JP] Japan .................. 54-130844

[51] Int. Cl.³ .................. G03B 9/40; G03B 9/08
[52] U.S. Cl. .................. 354/246; 354/249; 354/250
[58] Field of Search .......... 354/245, 246, 247, 248, 354/249, 250, 261

[56] References Cited

U.S. PATENT DOCUMENTS

| | | | |
|---|---|---|---|
| 3,810,223 | 5/1974 | Kitai et al. | 354/250 |
| 4,054,891 | 10/1977 | Onda et al. | 354/246 |
| 4,054,892 | 10/1977 | Nakagawa et al. | 354/246 X |
| 4,227,793 | 10/1980 | Arai | 354/246 |

*Primary Examiner*—Donald A. Griffin
*Attorney, Agent, or Firm*—Cushman, Darby & Cushman

[57] ABSTRACT

A blade type focal plane shutter comprising a plurality of auxiliary shutter blades which are pivoted on the side of an exposure aperture and can move between the unfolded position and folded position, a main shutter blade for forming an exposure slit which is rotatably supported on two of the auxiliary shutter blades and an actuating member which is pin-slot connected to the auxiliary shutter blades to move the auxiliary shutter blades and main shutter blade between the unfolded position and folded position so that the entire shutter can be made small and can be manufactured at a low cost.

7 Claims, 6 Drawing Figures

BLADE TYPE FOCAL PLANE SHUTTER

BACKGROUND OF THE INVENTION (a) Field of the Invention

This invention relates to blade type focal plane shutters and more particularly to a blade assembly in which shutter blades consist of a plurality of auxiliary blades and a main blade for forming an exposure slit.

(b) Description of the Prior Art

Generally, in a conventional blade type focal plane shutter, shutter blades divided into a plurality to cover an exposure aperture have been rotated by a pair of parallelly arranged arms or have been moved parallelly with the long side of a rectangular window forming the exposure aperture. That is to say, a main blade for forming an exposure slit is respectively pivotably supported by such means as calking to the tips of a pair of parallelly arranged arms so that, when the arms are rotated, the slit forming edge of the main blade will move while remaining parallel with the long side of the above mentioned rectangular window and a plurality of auxiliary blades to be used only for the purpose of covering the exposure aperture are respectively pivotably supported by such means as calking to the pair of arms so as to be rotated between the unfolded position and folded position by the rotation of the arms.

In such conventional shutter blade assembly, the pair of parallelly arranged arms have been indispensable components and have been required to be calked in every many parts. This means that the blade assembly requires many component parts and manufacturing steps. Therefore, there have been defects that this kind of shutter is comparatively high in the price and large in the size.

SUMMARY OF THE INVENTION

Therefore, a primary object of the present invention is to provide a blade type focal plane shutter wherein component parts are few and such manufacturing steps as of calking are reduced.

According to the present invention, this object is attained by pivoting a plurality of auxiliary shutter blades on the side of an exposure aperture, rotatably supporting a main shutter blade with two auxiliary shutter blades and moving the main shutter blade and auxiliary shutter blades with an actuating member which is pin-slot connected to the auxiliary shutter blades.

Another object of the present invention is to provide a blade type focal plane shutter formed to be easy to make smaller than the conventional one and to be able to be manufactured at a lower cost.

A further object of the present invention is to provide a blade type focal plane shutter which can be cocked with a comparatively small force and can be operated at a high speed.

These and other objects of the present invention will become more apparent during the course of the following detailed description and appended claims.

DESCRIPTION OF THE PREFERRED EMBODIMENTS

Figure 1:
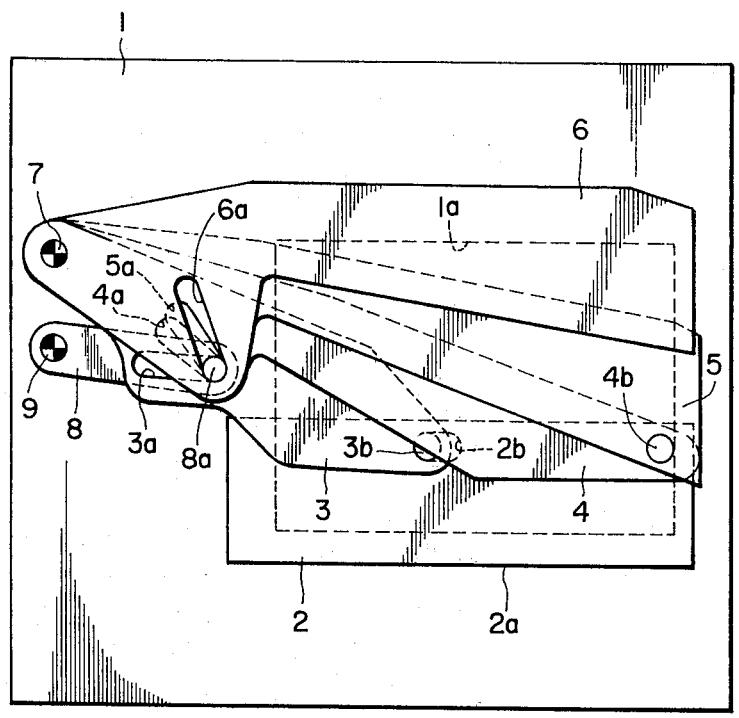
FIG. 1 is an elevational view of an embodiment of the focal plane shutter according to the present invention showing only a front blade group as cocked.

First of all, in FIG. 1, reference numeral 1 denotes a lower side shutter plate having a rectangular exposure aperture 1a, 2 denotes a main shutter blade for forming an exposure slit which has a slit forming edge 2a, and 3, 4, 5 and 6 respectively denote auxiliary shutter blades which are used only for the purpose of covering the exposure aperture 1a and form a front blade group. The auxiliary shutter blades 3, 4, 5 and 6 have respective cam slots 3a, 4a, 5a and 6a formed in them and are rotatably borne on a shaft 7 which is erected on the shutter plate 1. The cam slots 3a and 4a are so formed that, when the auxiliary shutter blades 3 and 4 are rotated by a later described driving pin, the main shutter blade 2 will be able to move parallelly with the long edge of the exposure aperture 1a. The main shutter blade 2 is pivoted in one end portion by calking to the tip 4b of the auxiliary shutter blade 4 and is supported in the intermediate portion by slidably fitting a slot 2b to a pin 3b which is erected at the tip of the auxiliary blade 3. Reference numeral 8 denotes a front blade actuating lever which has a driving pin 8a erected at the tip so as to slidably fit in the cam slots 3a, 4a, 5a and 6a and is rotatably borne on a shaft 9 erected on the shutter plate 1.

The operation of the above mentioned blade assembly shall be explained in the following.

First, in the cocked state in FIG. 1, when the actuating lever 8 is rotated counterclockwise by a driving means not illustrated as operatively connected with the operation of a release button on the camera side, the driving pin 8a will counterclockwise rotate the respective auxiliary blades 3, 4, 5 and 6 while sliding in the cam slots 3a, 4a, 5a and 6a. In this case, the rotating angles of the respective auxiliary shutter blades 3, 4, 5 and 6 will be different depending on the shapes of the respective cam slots but the auxiliary blades 3 and 4 will be rotated while the slit forming edge 2a of the main shutter blade 2 remains parallel with the long edge of the exposure aperture 1a. With the counterclockwise rotation of the auxiliary shutter blades 3, 4, 5 and 6 the front blade group will open the exposure aperture 1a while being folded. When the front blade group is folded on the upper side of the exposure aperture 1a as shown in FIG. 2, the rotation of the actuating lever 8 will be stopped.

Now, with reference to FIG. 3, the formation and operation including also the rear blade group shall be explained in the following.

Figure 2:
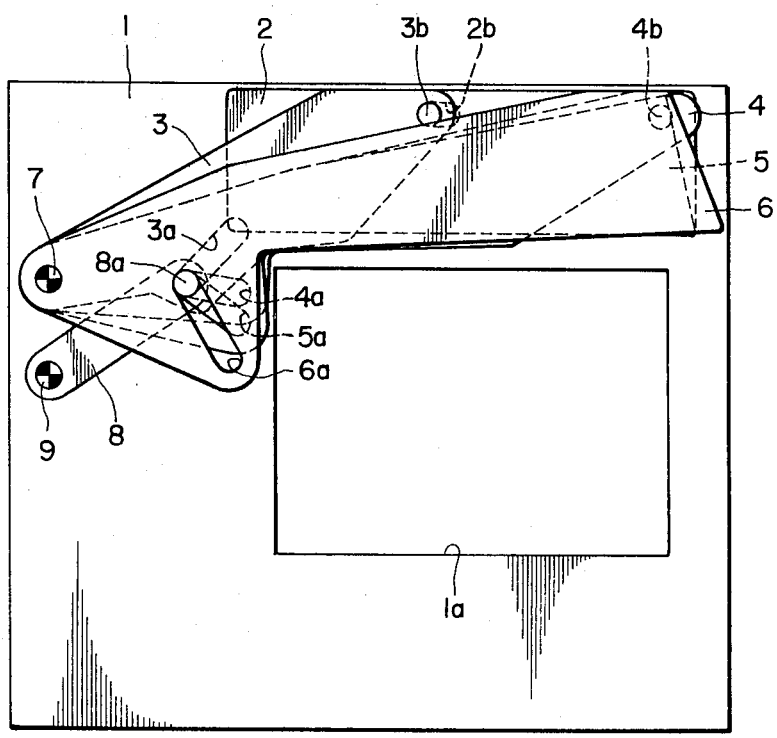
FIG. 2 is an elevational view in the case that the front blade group shown in FIG. 1 is uncocked to open the exposure aperture.
Figure 3:
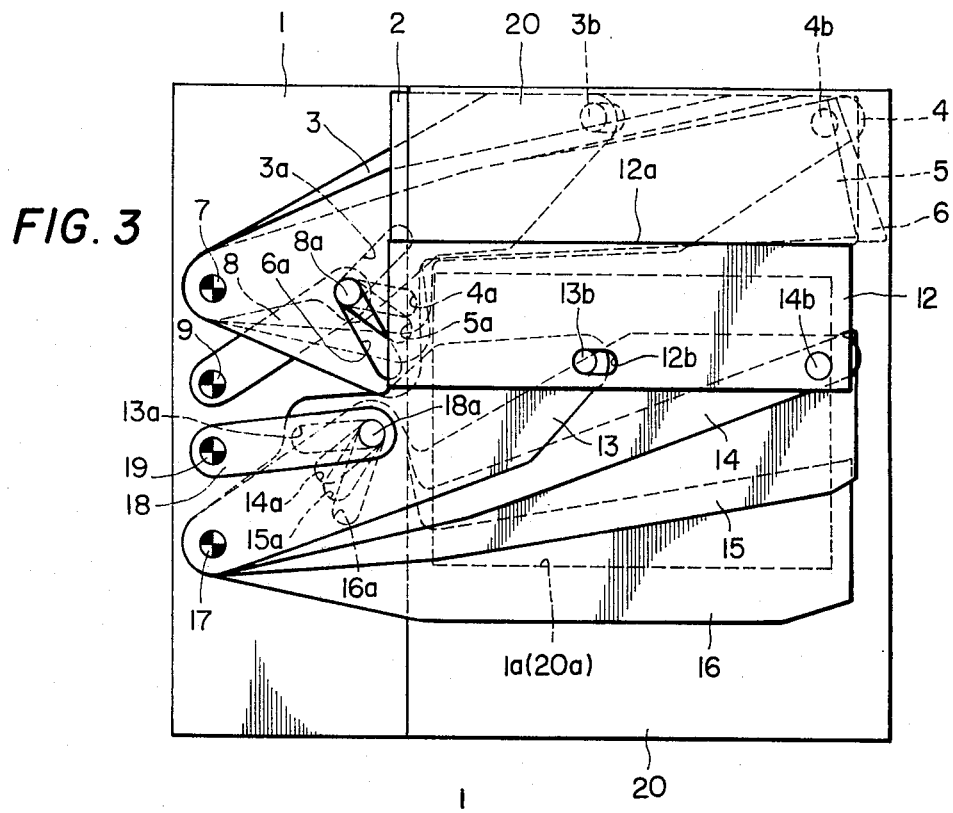
FIG. 3 is an elevational view corresponding to the state in FIG. 2, including and showing also a rear blade group formed the same as in the embodiment in FIG. 1.

FIGS. 1 and 2 show only the front blade group for the convenience of the brevity of the drawings but, in fact, as shown in FIG. 3, the shutter is formed by including also the rear blade group. The rear blade group is formed the same as the front blade group and is arranged in the mirror image relation with the front blade group. Therefore, its detailed explanation shall be omitted. Reference numeral 12 denotes a main shutter blade which is to form an exposure slit and has a slit forming edge 12a formed therein. 13, 14, 15 and 16 denote respective auxiliary shutter blades, 13a, 14a, 15a and 16a denote cam slots, 13b and 14b denote supporting pins for the main shutter blade 12, 17 denotes a shaft, 18 denotes a rear blade actuating lever, 18a denotes a driving pin, and 19 denotes a shaft. Further, 20 denotes a partition plate which separates the front blade group and rear blade group from each other and has a window 20a aligned with the exposure aperture 1a. Therefore, the front blade group will operate between the lower side shutter plate 1 and partition plate 20, the rear blade group will operate between the partition plate 20 and an upper side shutter plate (cover plate) not illustrated and the front blade group and rear blade group will not collide with each other.

Now, the operation of the above described formation shall be explained.

FIG. 3 shows an uncocked state in which the front blade group is folded on the upper side of the exposure aperture 1a and the rear blade group is unfolded to cover the exposure aperture 1a. When the shutter is operated to be cocked in this state, the front blade group will be unfolded by the clockwise rotation of the actuating lever 8 to cover the exposure aperture 1a (FIG. 1). At the same time, the rear blade group will be folded on the lower side of the exposure apertures 1a and 20a by the clockwise rotation of the actuating lever 18. When the release button is operated from the cocked state of the shutter, as shown in FIG. 2, the front blade group will be folded on the upper side of the exposure aperture 1a to open it and then, when a proper exposure time elapses, as shown in FIG. 3, the rear blade group will be unfolded to cover the exposure aperture 1a and one exposing operation will be completed.

Figure 4:
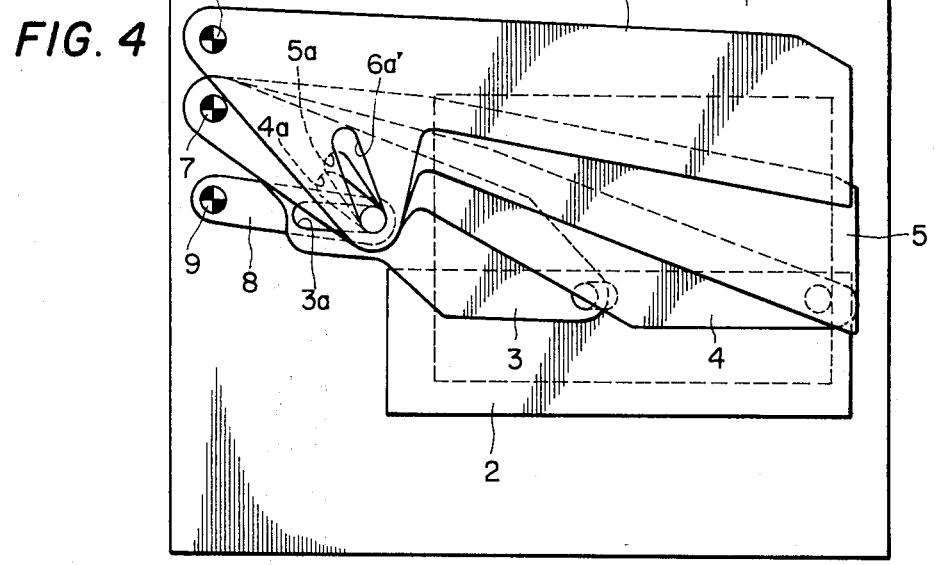
FIG. 4 is an elevational view corresponding to the sate in FIG. 1, showing another embodiment.
Figure 5:
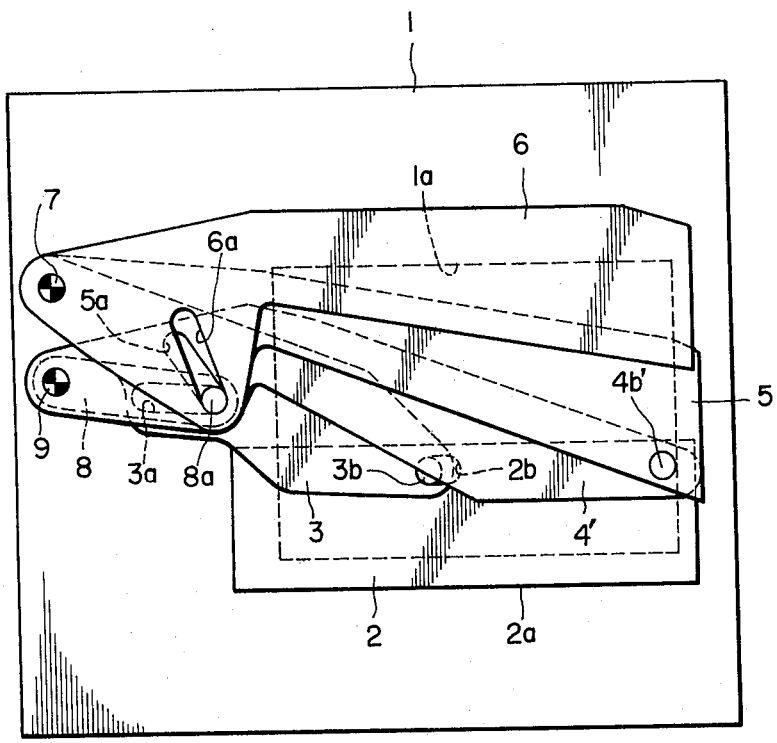
FIG. 5 is the same elevational view as in FIG. 4, showing further another embodiment.
Figure 6:
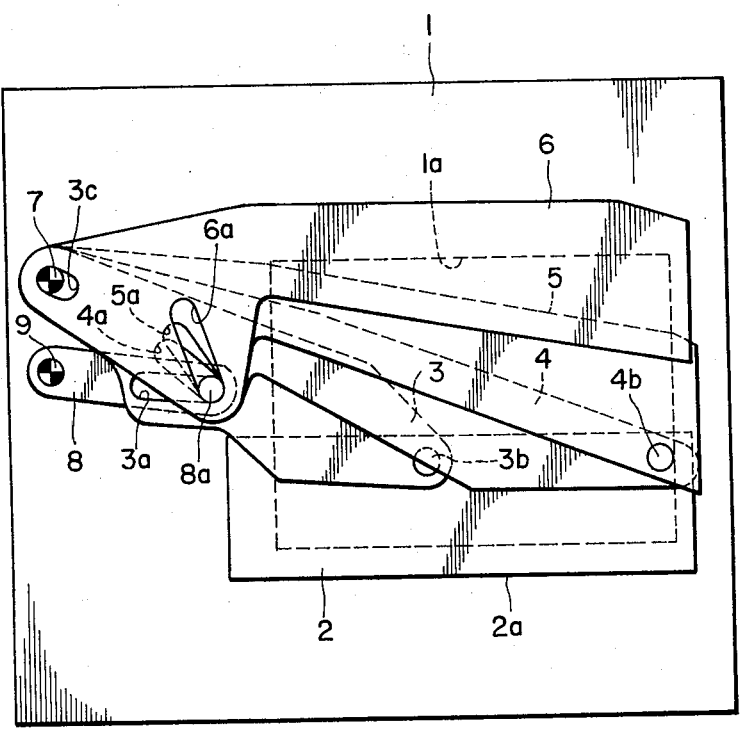
FIG. 6 is the same elevational view as in FIG. 5, showing further another embodiment.

The above is of the formation and operation of the embodiment of the focal plane shutter according to the present invention but it is needless to say that the present invention is not limited to it. For example, as shown in FIG. 4, a supporting shaft 7' of an auxiliary blade 6' may be provided separately from the other supporting shaft 7 and the auxiliary blades 5, 4 and 3 may be also in the same manner. Further, as shown in FIG. 5, an auxiliary blade 4' can be supported coaxially with the actuating lever 8. Furthermore, as shown in FIG. 6, the main shutter blade 2 may be pivoted by calking to the respective tip portions of the auxiliary shutter blades 3 and 4 and the auxiliary blade 3 may be supported on the shaft 7 through a slot 3c. As regards the slit forming edges, the slit forming edge 2a of the front blade group and the slit forming edge 12a of the rear blade group may be only parallel with each other and need not always be parallel with the long edge of the exposure aperture 1a. The slit forming edge 2a of the front blade group and the slit forming edge 12a of the rear blade group may be rotated in the same manner. Further, the shutter blade opening and closing operation is not limited to that of the above mentioned embodiment. That is to say, when the shutter is cocked, both front blade group and rear blade group may be unfolded to cover the exposure aperture 1a. When the shutter is uncocked, first the rear blade group may be folded and then the front blade group may be folded to open the exposure aperture 1a, then rear blade group may be unfolded to cover the exposure aperture 1a and at last the front blade group may be unfolded to doubly cover the exposure aperture 1a.

The main shutter blade and auxiliary shutter blades are generally formed of a metal. However, for example, the auxiliary shutter blades supporting the main shutter blade may be formed of a metal and the other auxiliary blades and main blade may be formed of an opaque plastic material. When some blades are thus formed of a plastic material, the inertia of the entire front blade group and rear blade group will reduce, a high speed shutter will be easy to obtain and the force required to cock the shutter will be able to be reduced.

I claim:

1. A focal plane shutter comprising a shutter plate having a rectangular exposure aperture formed therein, a plurality of auxiliary shutter blades rotatably supported on said shutter plate at one side of said exposure aperture to open and close said exposure aperture and having cam slots therein, an actuating member rotatably supported on said shutter plate at one side of said exposure aperture and having thereon a driving pin fitted in said cam slots, and a main shutter blade rotatably supported on two said auxiliary shutter blades adjacent to said main shutter blade with each other to open and close said exposure aperture in cooperation with said plurality of auxiliary shutter blades and capable of forming an exposure slit on said exposure aperture.

2. A focal plane shutter according to claim 1 wherein said cam slots in said two auxiliary shutter blades supporting said main shutter blade are so shaped that the slit forming edge of said main shutter blade moves parallelly with the long edge of said exposure aperture when said actuating member is moved to open and close said exposure aperture.

3. A focal plane shutter according to claim 1 wherein said cam slots in said two auxiliary shutter blade supporting said main shutter blade are so shaped that the slit forming edge of said main shutter blade is rotated around a point located on one side of said exposure aperture when said actuating member is moved to open and close said exposure aperture.

4. A focal plane shutter according to claim 1 wherein said main shutter blade is rotatably calked on one of two said auxiliary shutter blades adjacent to said main shutter blade with each other and is pin-slot connected to the other.

5. A focal plane shutter according to claim 1 wherein at least one of said plurality of auxiliary shutter blades is rotatably supported on said shutter plate in a position different from those of the other auxiliary shutter blades.

6. A focal plane shutter according to claim 1 wherein at least one of said auxiliary shutter blades supporting said main shutter blade is supported coaxially with said actuating member.

7. A focal plane shutter according to claim 1 wherein two said auxiliary shutter blades supporting said main shutter blade are formed of a metal material and at least one of the other of said auxiliary shutter blades and said main shutter blade is formed of an opaque plastic material.

* * * * *